United States Patent [19]

Shaddix

[11] 4,052,045
[45] Oct. 4, 1977

[54] ALIGNMENT OF FLANGES

[76] Inventor: Billy Joe Shaddix, 309 Fire Thorn Drive, Gretna, La. 70053

[21] Appl. No.: 709,783

[22] Filed: July 29, 1976

[51] Int. Cl.² .............................................. B23P 19/00
[52] U.S. Cl. ....................................... 269/43; 269/47; 269/53
[58] Field of Search ....................... 269/37, 43, 47, 53; 24/81 PE; 29/200 P, 200 J

[56] References Cited

U.S. PATENT DOCUMENTS

| 1,869,778 | 8/1932 | Roberts | 269/37 |
| 3,422,519 | 1/1969 | Fehlman | 29/200 P |
| 3,920,232 | 11/1975 | Clark | 29/200 P |

Primary Examiner—Al Lawrence Smith
Assistant Examiner—Robert C. Watson

[57] ABSTRACT

Disclosed is an apparatus for aligning flanges (e.g., to facilitate the proper coupling of the flanges). The apparatus is designed for use with flanges having matched patterns of holes therethrough for receiving coupling members (e.g., bolt and nut pairs). The flange alignment apparatus comprises a flange support having a body sized and shaped to extend partially (e.g., half way) around the periphery of a first flange and includes a plurality of pins projecting from the body and disposed in a pattern that matches a portion of the pattern of holes in a flange. The body also includes means for engaging the second flange thereby to support the second flange in proper alignment with the first flange. Preferably, the means that engage the second flange are adjustable thereby permitting adjustment in the orientation of the second flange relative to the flange support, and, thus, relative to the first flange.

The apparatus may include, in combination with the flange support, a template releasably securable to one of the flanges and having a series of openings for removably supporting bolts or nuts that will be used to connect the two flanges. The template may itself have a series of bolts received in threaded openings therein; those bolts operative, upon being advanced with respect to the template, to bear against the flange in order to withdraw the template from the bolts or nuts supported therein after the two flanges have been connected.

12 Claims, 2 Drawing Figures

U.S. Patent   Oct. 4, 1977   4,052,045
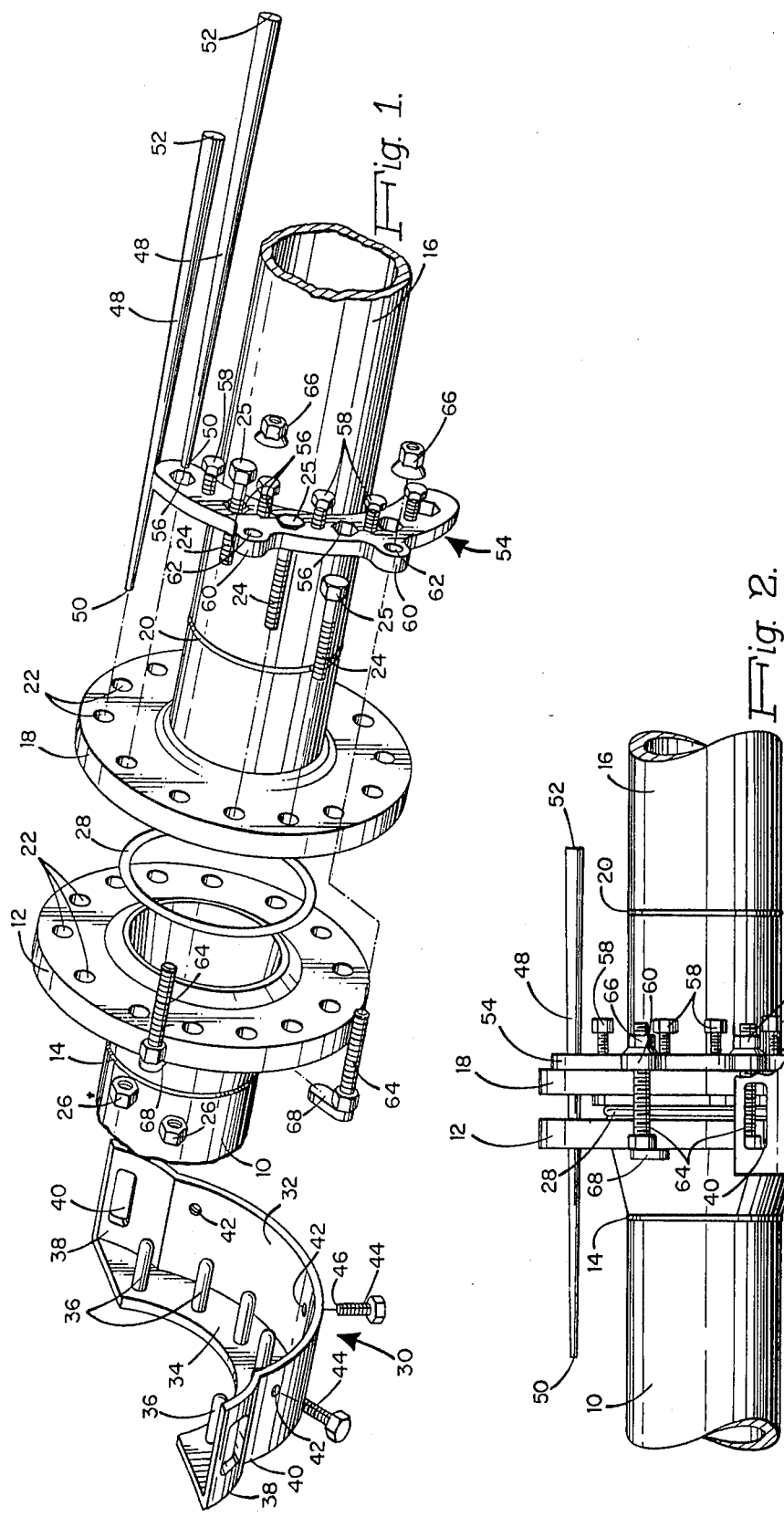

ALIGNMENT OF FLANGES

BACKGROUND OF THE INVENTION

The present invention relates to apparatus facilitating the connection of conduit segments. In particular, it relates to apparatus that facilitates the completion of flange-type connections between conduit segments.

The laying of pipelines or other conduits in submerged locations can be a difficult and time consuming task, especially where the conduits are large (and thus heavy). It is often virtually impossible for divers to manually align the flanges and achieve a desirable joint therebetween. Submerged power apparatus is essentially unavailable and would be prohibitive in cost. Supporting and moving the conduit segments employing power apparatus on the surface (e.g., a crane supported on a barge) is quite difficult in view of the relatively fine adjustments in conduit position or orientation that may be required during a coupling operation.

There is thus a need, and a need that is growing as the requirements for submerged conduits grows, for an effective flange alignment system and technique that is relatively simple and efficient to employ even in the difficult conditions under which the divers must work (e.g., difficulty of applying large manual forces).

Naturally, there have been many previous proposals for apparatus to facilitate the coupling of conduits. One common technique involves the use of a cradle to support the opposed conduit ends during, and even after, the coupling operation. Examples of this type of arrangement can be found in Roberts U.S. Pat. No. 1,869,778 and in Lochridge U.S. Pat. No. 3,603,617, the latter assigned to the assignee of the present invention. Such systems, however, require a relatively firm bed for the cradle to rest upon to order to be successfully employed; are often not reusable (e.g., the cradle often remains permanently in place beneath the pipes even after completion of the coupling); and typically have no provision for the simple and effective adjustment of orientation of one conduit relative to the other to achieve the precise alignment necessary for proper coupling.

Another arrangment for dealing with the problem of submerged coupling of heavy conduits is exemplified by Robley U.S. Pat. No. 3,267,682 and by Burrows U.S. Pat. No. 1,874,081. Each of these teaches the use of a crane supported on a barge on the surface of the body of water, the crane being used to lower a large frame that carries a conduit segment to the bed of the body of water for placement adjacent an existing conduit segment. Once the new segment is lowered in place, divers complete the connection after the conduit has been manipulated to precise alignment with the existing conduit segment by either maneuvering of the remote crane or a power system for moving the new conduit segment internally in the submerged frame (e.g., see Robley U.S. Pat. No. 3,267,682). Such proposals, of course, require expensive, sophisticated equipment.

OBJECTS AND SUMMARY OF THE INVENTION

In view of the above discussion it is a principal object of the present invention to provide an apparatus for facilitating the coupling of conduit segments having terminal coupling flanges.

More particularly, it is an object to provide such apparatus which is suitable for convenient and effective usage in submerged locations.

Briefly, the invention contemplates flange alignment apparatus suitable for aligning first and second flanges, each having a series of holes therethrough in a predetermined pattern. The apparatus comprises a flange support that has a body means adapted to extend partially around the periphery of the first flange and a plurality of pins that project from that body means and that are adapted to be received in the first flange holes. The body means include a second flange support portion that is disposed, when the pins are received in the first flange holes, to engage the second flange, thereby facilitating alignment of the second flange with the first flange. Preferably, the support portion includes adjustable means that actually engage the second flange, thereby enabling adjustment of the orientation of the second flange relative to the first flange.

Again preferably, the invention includes, in combination with such a flange support, a template that is releasably securable to one of the flanges and that includes a plurality of openings therethrough in a pattern matching a portion of the pattern of holes in that flange. With the template releasably secured to the flange, with its openings in alignment with the holes of the flange, the template can serve as a temporary support for members (e.g., nuts or bolts) employed to secure the first and second flanges together. The template may include template release means in the form of threaded members engaged in threaded openings in the template. After the flanges have been secured together, the template may be withdrawn from the securing members (which it releasably supported) by advancing the threaded members in the threaded openings in the template to bear against the flange and to drive the template away from the flange. Additionally, a plurality of drift pins may be provided in combination with the flange support in order to facilitate preliminary alignment of the flanges. Each drift pin is tapered along its length and has a cross sectional size at one end that is smaller than the cross sectional size of holes in the flanges and a cross sectional size of the other end that is larger than the cross sectional size of those holes.

THE DRAWINGS

In describing the invention, reference will be made to a preferred embodiment illustrated in the appended drawings. In the drawings:

FIG. 1 is an exploded, perspective view of apparatus constructed in accordance with the present invention illustrating the relationship of that apparatus to terminal flanges of conduit segments that are to be secured together; and FIG. 2 is a side elevation of the apparatus, and of the conduit segments, of FIG. 1 showing the apparatus in position to align the conduit flanges that are to be secured together.

DETAILED DESCRIPTION OF A PARTICULAR PREFERRED EMBODIMENT

Referring to the drawings there is shown a first conduit segment 10 having a terminal flange 12 secured thereto (e.g., as by weld seam 14) and a second conduit 16 having a terminal flange 18 secured thereto (weld seam 20). Each of the flanges has an array of peripheral holes 22, disposed in matching symmetrical patterns, by means of which the flanges may be secured to each other using bolts 24 and nuts 26. Prior to the connection of the flanges 12 and 18, a gasket 28 may be placed therebetween, as is conventional.

The apparatus according to the present invention comprises a flange support body 30 that includes a generally semi-cylindrical portion 32 and an integral, semicircular, inwardly directed lip 34 upon which are mounted a plurality of longitudinally disposed pins 36. The pins 36 are arranged in a pattern to match the pattern of holes 22 in flange 12. The portion 32 includes flared end portions 38 having hand-grip openings 40 therein to facilitate handling of the flange support 30, and a series of threaded openings 42 therethrough at a location longitudinally spaced apart from the pins 36. Each threaded opening 42 receives a threaded member 44 (e.g., a bolt) such that the tip 46 of the member 44 is directed substantially toward the longitudinal axis of the flange support 30.

For use in conjunction with the flange support 30, as further described below, there may also be provided a plurality of elongate drift pins 48, each having a cross section at a first end 50 that is smaller than the cross section of the openings 22 and a cross section at a second end 52 that is larger than the cross section of the openings 22.

The invention also contemplates the provision of a template 54 of generally semi-circular construction having a plurality of openings 56 therethrough in a pattern that matches the pattern of holes 22 in the flanges. The openings 56 are shaped and sized to receive the head 25 of a bolt 24 that is used to secure the flanges to each other to join conduit segments 10 and 16. Other openings in the template 54, intermediate the openings 56, are provided and are threaded to receive threaded members 58. The template 54 is shaped to match the shape of flange 18 around a portion of the periphery thereof with the openings 56 in alignment with the holes 22 of the flange. A pair of lobes 60 project from the main body of the template 54 and include openings 62 for receiving bolts 64 that are engagable with nuts 66. Each bolt 64 includes a radially directed flange 68 at the bolt head disposed for engagement with a radial surface of the flange 12.

In operation of the apparatus, the flange support 30 is manipulated to engage the pins 36 into the holes 22 of flange 12 such that the semi-cylindrical body 32 projects longitudinally beyond the flange 12 and is positioned to engage the flange 18. Actual contact with the flange 18, however, is made by the tips 46 of bolts 44. The flange support 30 is thus supported on flange 12 and assists in supporting and in aligning the flange 18 relative to the flange 12. The bolts 44 can be rotated with a wrench as necessary to bring the flange 18 into alignment with the flange 12 such that the openings of the two flanges are aligned to receive the bolts 24. The drift pins 48 are used once there is substantial alignment, to help indicate where fine adjustments of flange orientation is required.

Once alignment has been achieved, the template 54 can be releasably secured to the aligned flanges by passing the bolts 64 through the openings 62 of the template, engaging the flanges 68 behind the edge of flange 12, and tightening the nuts 66 on the bolts 64 snugly against the template lobes 60 with the template oriented such that the holes 56 are aligned with openings 22 in the flange 18. With this arrangement, the bolts 24, which secure the conduit segments together, can be inserted through the openings 56, and then through the aligned pairs of holes 22 in the two flanges 18 and 12, until the heads 25 of the bolts 24 are received in the openings 56. Nuts 26 can then be screwed onto the bolts 24, with the template 54 preventing rotation of the bolts while the nuts are tightened. Once the nuts 26 have been tightened on all bolts 24 that are thus retained by the template 54, the flange support 30 can be removed entirely and the template removed by advancing bolts 58 to bear against the flange 18. The template is then reinstalled on the flange 18 in an orientation such that the openings 56 are now aligned with the remaining holes 22 of flange 18 that have not yet received a bolt 24. With the template 54 in that location, the remaining bolts 24 can be installed to complete the connection of the conduit segments 10 and 16.

SUMMARY OF MAJOR ADVANTAGES OF THE INVENTION

From the discussion above, it will be seen that the apparatus according to the present invention facilitates the precise alignment of flanges even in difficult circumstances (e.g., submerged conduits) without requiring expensive powered apparatus. By use of a member that is supported on one flange and that is disposed to engage the other flange for alignment thereof with the first flange, the need for separate adjustable support for each flange is avoided. The use of pins 36 of the member 30 to both support that member on a flange and properly align it with respect thereto assures a simple and convenient operation easily accomplished by workers even in adverse environments. Similarly, the adjustment of the second flange position by means of the adjustment of bolts 44 permits simple and precise adjustment of the orientation of that flange.

The template, on the other hand, facilitates retention of the connector bolts while connection of the conduits is being established and can be an important asset when working in submerged conditions. For example, the difficulty of submerged operations would probably prevent a single diver from employing a pair of wrenches to engage both the head 25 of the bolt 24 and the nut 26 to tighten the connection, unless the conduits and flanges were quire small. With the use of the template according to the present invention, however, virtually every stage of the connecting procedure can be accomplished as a one-man operation, if desired.

Although the invention has been described with reference to particular embodiments, other additions, are not specifically described, will occur to those skilled in the art as well as modifications, substitutions, and deletions, all of which fall within the spirit and scope of the invention as defined by the following claims.

I claim:

1. Flange alignment apparatus for aligning first and second flanges each having a series of holes therethrough in a predetermined pattern, the pattern of holes of said second flange being a mirror-image of the pattern of holes of said first flange, the flange alignment apparatus comprising a flange support comprising body means adapted to extend partially around the periphery of said first flange and a plurality of pins projecting from said body means, said pins being disposed in a pattern that matches a portion of said pattern of holes in said first flange and being adapted to be received in the holes of said pattern portion, said body means including a second flange support portion disposed to engage said second flange when said pins are received in said first flange holes, thereby facilitating alignment of said second flange with said first flange.

2. An apparatus as described in claim 1 wherein adjustable means are mounted on said support portion of said body means, said adjustable means positioned for engagement with said second flange, thereby enabling adjustment of the orientation of said second flange relative to said first flange.

3. An apparatus as described in claim 2 wherein said adjustable means comprise a plurality of threaded members disposed in threaded holes in said support portion of said body means.

4. An apparatus as described in claim 1 wherein said body means are sized to extend substantially one half way around the periphery of said first flange.

5. An apparatus as described in claim 4 wherein said body means are generally semicircular in shape.

6. An apparatus as claimed in claim 5 wherein said body means comprise a generally semicylindrical portion that includes said support portion and a radially inwardly directed annular lip upon which are mounted said pins.

7. An apparatus as described in claim 6 wherein said semicylindrical portion and said annular lip are integral.

8. An apparatus as claimed in claim 1 further comprising a template releasably securable to one of said flanges and including a plurality of openings therethrough in a pattern matching a portion of the pattern of holes in said one of said flanges, whereby alignment of the openings in said template with the holes in said flange enables said template to releasably support members employed to secured said first and second flanges together.

9. An apparatus as described in claim 8 wherein said template is substantially semicircular in shape.

10. An apparatus as described in claim 8 wherein said template further comprises a plurality of threaded elongate members mounted in threaded openings through the template at locations intermediate said first-mentioned template openings, thereby enabling withdrawal of said template from said members securing said first and second flanges by the advancing of said threaded members in said threaded openings of said template.

11. An apparatus as described in claim 10 wherein a threaded elongate member is provided on said template intermediate each adjacent pair of said template openings.

12. An apparatus as claimed in claim 1 further comprising a plurality of drift pins adapted to be received in holes of said flanges, each said drift being tapered along its length and having a cross sectional size at one end of the drift pin that is smaller than the cross sectional size of said holes in said flanges and having a cross sectional size at the other end of the drift pin that is larger than the cross sectional size of said holes in said flanges.

* * * * *